(12) United States Patent
Purrio et al.

(10) Patent No.: US 11,724,374 B2
(45) Date of Patent: Aug. 15, 2023

(54) HOLLOW-CYLINDRICAL PRELOADING CARTRIDGE FOR AN INSTALLATION TOOL OF A WIRE THREAD INSERT, THE INSTALLATION TOOL, A RETROFIT KIT WITH HOLLOW-CYLINDRICAL PRELOADING CARTRIDGES FOR IT AS WELL AS AN INSTALLATION METHOD FOR THE WIRE THREAD INSERT

(71) Applicant: BÖLLHOFF VERBINDUNGSTECHNIK GmbH, Bielefeld (DE)

(72) Inventors: Marcel Purrio, Bielefeld (DE); Thorben Schiemann, Nienstädt (DE); Alexej Butov, Gütersloh (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 0 days.

(21) Appl. No.: 17/979,368

(22) Filed: Nov. 2, 2022

(65) Prior Publication Data

US 2023/0139341 A1 May 4, 2023

(30) Foreign Application Priority Data

Nov. 4, 2021 (EP) .................................. 21206551

(51) Int. Cl.
*B25B 27/14* (2006.01)
*F16B 37/12* (2006.01)
(52) U.S. Cl.
CPC .......... *B25B 27/143* (2013.01); *F16B 37/122* (2013.01)
(58) Field of Classification Search
CPC ....... B25B 27/14; B25B 27/143; B25B 27/18; B25B 27/24; B25B 27/28; B25B 27/30;
(Continued)

(56) References Cited

U.S. PATENT DOCUMENTS 3,694,888 A * 10/1972 Bosse .................. B25B 27/143
81/57.4
4,172,314 A * 10/1979 Berecz ................. B25B 27/143
29/240.5
(Continued)

FOREIGN PATENT DOCUMENTS

DE 2143182 A1 4/1972
EP 1084800 A2 3/2001

OTHER PUBLICATIONS

EP Extended Search Report for EP Application No. 21206551.0 dated Apr. 29, 2022 (5 pages).
(Continued)

*Primary Examiner* — Robert J Scruggs
(74) *Attorney, Agent, or Firm* — Reising Ethington P.C.

(57) ABSTRACT

A hollow-cylindrical preloading cartridge of an installation tool of a wire thread insert has a mandrel channel extending within the preloading cartridge, in which an assembly mandrel with an installation end and a drive end is guided in an inner mandrel guiding thread. The cartridge has an outer wall which encompasses the mandrel channel at least partly with a radial positioning window adjacent to a first axial end of the preloading cartridge facing away from the drive end of the assembly mandrel, through which a wire thread insert is positionable on the assembly mandrel. At least one first tactile detection unit projects beyond a ring-like front side of the cartridge on the first axial end and is offsetable parallel to a longitudinal axis of the cartridge, wherein an axial offset of the at least one tactile detection unit can be detected with a first detection sensor of the cartridge.

19 Claims, 8 Drawing Sheets

(58) Field of Classification Search
CPC ... B25B 27/302; B25B 27/304; B25B 27/306; B25B 27/308; B21J 15/38; B23P 19/04; B23P 19/048; B23P 19/06; B23P 19/065; B21C 37/15; B21H 3/00; Y10T 29/49771; Y10T 29/49776; Y10T 29/49778; Y10T 29/53622; Y10T 29/53687; Y10T 29/53691

See application file for complete search history.

(56) References Cited

U.S. PATENT DOCUMENTS

| | | | |
|---|---|---|---|
| 4,553,302 A | 11/1985 | Cosenza et al. | |
| 6,367,138 B1 | 4/2002 | Newton et al. | |
| 6,470,557 B2 | 10/2002 | Newton et al. | |
| 2004/0112179 A1* | 6/2004 | Newton | B23P 19/048 81/57.11 |
| 2010/0325857 A1* | 12/2010 | Szewc | B25B 27/143 29/240.5 |

OTHER PUBLICATIONS

English Translation, EP Extended Search Report for EP Application No. 21206551.0 dated Apr. 29, 2022 (5 pages).

\* cited by examiner

HOLLOW-CYLINDRICAL PRELOADING CARTRIDGE FOR AN INSTALLATION TOOL OF A WIRE THREAD INSERT, THE INSTALLATION TOOL, A RETROFIT KIT WITH HOLLOW-CYLINDRICAL PRELOADING CARTRIDGES FOR IT AS WELL AS AN INSTALLATION METHOD FOR THE WIRE THREAD INSERT

CROSS REFERENCE TO RELATED APPLICATIONS

This application claims the priority to EP Patent Application No. EP21206551.0 filed on Nov. 4, 2021, and the entire content of this priority application is incorporated herein by reference in its entirety.

TECHNICAL FIELD

The present disclosure refers to a hollow-cylindrical preloading cartridge of an installation tool of a wire thread insert, which is used in combination with an installation module and a drive module in the installation tool. Furthermore, the present disclosure relates to a retrofit kit with several hollow-cylindrical preloading cartridges, an installation tool of the above composition as well as an installation method for the wire thread insert in a thread bore of a component with an installation tool.

BACKGROUND

In order to be able to reliably establish a thread connection in components out of materials that are mechanically less resilient, as for example plastic material and metal, wire thread inserts are inserted into bore holes with inner thread. The wire thread insert is made of a cylindrical wire coil of a profiled wire. It is wound with an oversize with respect to the inner thread of the thread bore that is supposed to be reinforced.

An installation tool uses a preloading cartridge in order to wind the wire thread insert onto an assembly mandrel of the installation tool having an outer diameter matching the inner thread.

Such installation tools are described as manual devices in U.S. Pat. No. 4,553,302. The solely manually driven tools often operate too slowly or they lack the necessary torque for the installation of the wire thread insert.

A motor driven installation tool is described in US 2010/0325857 A1. The installation tool uses a preloading cartridge, which is preloaded in the installation tool in a spring-offsetting manner. Before the installation of the wire thread insert, the ring-like front face of the preloading cartridge rests against the component adjacent to the thread bore. While the assembly mandrel rotates the wire thread insert into the thread bore, the preloading cartridge dives into the installation tool against the load of a spring.

Frequently, the problem is to determine the installation depth of the wire thread insert in the thread bore. This guarantees a fitting thread reinforcement in adaptation to the thread element to be screwed in.

For this purpose, DE 21 43 182 discloses a micro switch downstream of an installing assembly mandrel. The micro switch is activated as soon as the assembly mandrel with the wire thread insert has reached a certain depth in the thread bore. The micro switch then causes a reversion of the rotation direction of the motor rotating the assembly mandrel. Accordingly, the assembly mandrel is rotated out of the wire thread insert and the wire thread insert is installed in the thread bore.

The manual as well as the automatic installation of wire thread inserts often bears the problem that the orientation of the installation tool and thus the installation direction are not clearly defined. This leads to installation faults, wear of the assembly mandrel as well as additional working effort for correcting the installed wire thread insert.

It is therefore the object of at least some implementations of the present disclosure to provide an installation tool with which a wire thread insert is installable reliably.

SUMMARY

The above object is solved by means of a hollow-cylindrical preloading cartridge of an installation tool of a wire thread insert, by an installation tool of a wire thread insert with an installation module with the hollow-cylindrical preloading cartridge as well as a motoric drive module, by a retrofit kit for an installation tool of a wire thread insert with a number of hollow-cylindrical preloading cartridges as well as by an installation method for a wire thread insert in a thread bore of a component with an installation tool are disclosed. Advantageous designs and further developments of the present disclosure result from the following description, the accompanying drawings as well as the appending claims.

The present disclosure includes a hollow-cylindrical preloading cartridge of an installation tool of a wire thread insert comprising the following features: a mandrel channel extending within the preloading cartridge, in which an assembly mandrel with an installation end and a drive end is guided in an inner mandrel guiding thread, an outer wall of the preloading cartridge which encompasses the mandrel channel at least partly with a radial positioning window adjacent to a first axial end of the preloading cartridge facing away from the drive end of the assembly mandrel, through which a wire thread insert is positionable in the mandrel channel on the assembly mandrel, at least a first tactile detection unit may project beyond a ring-like front side of the preloading cartridge on the first axial end and being offsetable parallel to a longitudinal axis of the preloading cartridge, wherein an axial offset of the at least one tactile detection unit is detectable with a first detection sensor of the preloading cartridge.

The preloading cartridge has proven, constructive features such as a hollow cylindrical shape as well as a radial positioning window for installing a wire thread insert. The use of a mandrel guiding thread which is arranged at the radial inner side of the hollow cylindrical preloading cartridge builds upon these known and proven constructive features. The mandrel guiding thread holds the assembly mandrel and offsets it in longitudinal direction of the preloading cartridge and the assembly mandrel depending on a rotation of the assembly mandrel about the longitudinal axis. As a pitch of the mandrel guiding thread may be known, an axial offset in installation direction of a wire thread insert to be installed can be derived from the rotation of the assembly mandrel. In this context, the installation direction is defined such that it extends parallel to the longitudinal axis of the assembly mandrel and directs into the thread opening of a component.

Beside the guiding of the assembly mandrel in an inner mandrel guiding thread of the preloading cartridge, at least one first tactile detection unit may project beyond the ring-like front side of the preloading cartridge at its first axial end. The ring-like front side may form the axial end of the preloading cartridge which faces the component and the thread opening or thread bore, respectively, which is chosen for the installation of the wire thread insert. Beside a ring-like front side, polygonal or elliptic constructions may be chosen as well. The at least one tactile detection unit comprises a detection sensor with which an axial offset of the tactile detection unit can be detected. As the tactile detection unit projects beyond the ring-like front side of the preloading cartridge, it may establish a physical contact to the adjacent surface of the component with the thread bore. In this way, the at least one first tactile detection unit detects a distance to the adjacent component surface in qualitative shape and/or in absolute shape. In this context, qualitative means that in a control device, a distance range between ring-like front side of the preloading cartridge and the adjacent component surface may be stipulated, within which a distance detected by the tactile detection unit should lie. In another embodiment, the at least one first tactile detection unit may determine an absolute distance of the ring-like front side of the preloading cartridge and the adjacent surface of the component.

According to a further embodiment of the hollow-cylindrical preloading cartridge, the at least one tactile detection unit comprises a sensor pin that is arranged in a spring preloaded manner in a channel of the outer wall.

In order to detect a possible distance between the ring-like front side of the preloading cartridge and an adjacent component surface, the tactile detection unit comprises a spring-preloaded sensor pin beside a sensor. The sensor pin may be guided in a channel of the outer wall of the hollow-cylindrical preloading cartridge. The spring pretension causes the sensor pin to be pressed in the installation direction of the wire thread insert due to the spring effect. This causes the sensor pin to project with its feeler end beyond the ring-like front side of the preloading cartridge and to be pressable against the force of the spring pretension by an adjacent component surface in the channel in the wall of the preloading cartridge. As during this axial movement, the sensor pin moves along the first detection sensor, changes in the axial position of the sensor pin with respect to the preloading cartridge can be detected. This information may be assessed so as to detect a distance of a neighboring component surface and the ring-like front side of the preloading cartridge, to evaluate it and to provide, based on this information, the installation tool with control information during the installation of the wire thread insert.

The sensor pin may comprise an axial feeler end and an axial detection end wherein the axial feeler end is arranged adjacent to the ring-like front side and the axial detection end is arranged adjacent to the first detection sensor.

As has already been mentioned above, the sensor pin includes a feeler end projecting beyond the ring-like front side as well as an detection end moving adjacent to the detecting sensor. As the detection sensor can be of different types of sensors, as for example an inductive sensor, a capacitive sensor or an optical sensor, the axial detection end of the sensor pin is adapted according to the sensor principle. In case of an optical sensor, the detection end serves for reflecting or interrupting or similar of specific optical signals of the sensor so as to produce an optical signal according to the axial position of the sensor pin. With regard to an inductive or a capacitive sensor, the detection end of the sensor pin changes the electromagnet field surrounding the sensor or changes the capacity sensed in the sensor so that due to these changes, a change of the axial position of the sensor pin can be detected, too. This change in the axial position of the sensor pin may be caused by a contact between the adjacent component surface and the detection end. As the sensor pin is spring-preloaded in installation direction, it is also possible that the spring effect moves the sensor pin in installation direction without this movement being limited by a contact with an adjacent component surface. That means that in this way, the spring pretension of the sensor pin would cause an axial deflection of the sensor pin which correspondingly generates a signal in the detection sensor.

According to a further embodiment of the hollow-cylindrical preloading cartridge, its assembly mandrel includes a switch feature adjacent to the drive end which interacts with a mandrel sensor in order to detect an axial offset of the assembly mandrel in an installation direction of the wire thread insert.

In order to be able to detect a result of an installation process of a wire thread insert in the thread opening of the component as precisely as possible, it is necessary to obtain information regarding the axial offset of the wire thread insert in installation direction. This axial offset arises from the movement of the assembly mandrel. Depending on the rotation of the assembly mandrel within the mandrel guiding thread of the preloading cartridge, the wire thread insert that is arranged on the installation end of the assembly mandrel is moved in installation direction. Depending on the number of rotations of the assembly mandrel and a pitch of the inner mandrel guiding thread, the axial offset of the wire thread insert in installation direction can be determined. This axial offset of the wire thread insert contributes to the assembly in the thread bore only when the wire thread insert leaves the preloading cartridge or passes the ring-like front side of the preloading cartridge in installation direction. In order to detect the moment of passing of the wire thread insert or the installation end of the assembly mandrel, respectively, at the ring-like front side of the preloading cartridge, i.e. the moving of the installation end out of the hollow cylindrical inside of the preloading cartridge, the switch feature is provided adjacent to the drive end of the assembly mandrel. This switch feature is a length-dependent indicator showing that the installation end of the assembly mandrel leaves the preloading cartridge when it is detected. Such a switch feature may be realized by means of a switch edge or a recess in the assembly mandrel, which can be detected with the help of an inductive or an optical sensor. That means that provided the sensor perceives or detects this switch edge, this is equal to the information that the installation end of the assembly mandrel leaves the preloading cartridge.

This information is used for determining the further axial offset of the wire thread insert or the assembly mandrel, respectively, in installation direction starting from this point in time of detecting i.e. the point in time when the preloading cartridge leaves through the installation end of the assembly mandrel. This axial offset may be determined by detecting a covered rotation angle of the assembly mandrel from this point in time. Based on this rotation angle, the axial way of the assembly mandrel in installation direction arises in multiplication with the pitch of the inner mandrel leading thread. As the wire thread insert is held on the assembly mandrel at the end of the assembly mandrel, i.e. at the installation end, the detected rotation angle of the assembly mandrel in combination with the pitch of the inner mandrel guiding thread represents the covered way of the wire thread insert in installation direction. Ideally, the information serves for determining how far the wire thread insert has been rotated into the thread bore.

With regard to the sensors, the first detection sensor and a mandrel sensor may be an inductive sensor or a capacitive sensor or an optical sensor.

As has already been mentioned above, the movement of the sensor pin of the at least one tactile detection unit as well as the movement of the assembly mandrel are detected with the help of sensors. For this purpose, the pin cooperates with a detection sensor while the assembly mandrel is combined with a mandrel sensor. According to different embodiments of the present disclosure, these sensors may be formed by inductive or capacitive or optical sensors. It is also possible that a combination of these measuring principles is used for reliably detecting the movement of the sensor pin and the assembly mandrel.

A further embodiment of the hollow-cylindrical preloading cartridge may include a second tactile detection unit which projects beyond the ring-like front side of the preloading cartridge at the first axial end and can be offset parallel to a longitudinal axis of the preloading cartridge, wherein an axial offset of the second tactile detection unit is detectable with a second detection sensor of the preloading cartridge. The first and the second tactile detection unit may be spaced from one another by an angle (a) from the range of 10° to 350° on the ring-like front side. The preloading cartridge may comprise, in an axial section between the ring-like front side and the positioning window, an inner thread for the preinstallation of a wire thread insert.

Adjacent to the positioning window of the preloading cartridge, an inner thread for screwing in the assembly mandrel with wire thread insert arranged on it may be provided. The wire thread insert may be preloaded within this inner thread such that its diameter is reduced for a facilitated screwing-in into the thread bore of the component.

Furthermore, the present disclosure includes an installation tool of a wire thread insert with a motoric drive module and an installation module with a preloading cartridge according to one of the previously described configurations.

In order to be able to effectively use the preloading cartridge with its at least one tactile detection unit, the preloading cartridge is coupled with a motoric drive module. The drive module establishes a mechanical connection to the assembly mandrel so that the latter is rotated with a motor of the drive module and is thus offsetable in installation direction. The motoric drive module may include a stepping motor or a compressed-air motor or another kind of drive for the assembly mandrel. This drive may also provide the detection of the covered rotation angle as well as the torque transmitted by the assembly mandrel during the rotation of the assembly mandrel or the drive module. With this technical embodiment, it is possible to determine the axial offset of the installation end of the assembly mandrel after leaving the preloading cartridge (see above). Furthermore, the detection of the torque allows an assessment of a condition of an installation operation. The detecting of the rotation angle and of a torque of a motoric drive module is known in the state of the art so that this function can be implemented without further ado.

In the installation tool, the preloading cartridge may be arranged in an installation module. According to different embodiments of the disclosure, the installation module or the preloading cartridge may be releasably connectable with the drive module.

According to a further configuration of the installation tool, the preloading cartridge may be releasably connectable with the drive module. This forms the basis for wire thread inserts of different dimension, i.e. of different diameters, to be installable with the help of the drive module and a corresponding preloading cartridge, as the assembly mandrel of the preloading cartridge is adapted to the wire thread insert to be installed. Accordingly, it is necessary, depending on the wire thread insert to be installed, to connect the respective preloading cartridge with the drive module and to carry out the installation after that Furthermore, the installation tool may be alternatively connected with an installation automat, which may be controlled by a robot, or is provided as a manual device.

According to different embodiments of the present disclosure, the installation tool may be used in combination with an installation automat or as a manual device. The different application alternatives have an influence on the equipment of the preloading cartridge with the number of tactile detection units. Because in an installation automat, the installation tool may be fixedly arranged in terms of its alignment to the thread bore. Therefore, due to this arrangement, a tilting of the installation tool with respect to the longitudinal axis of the thread bore is mostly excluded. In this case, it may be sufficient when the preloading cartridge is equipped with only one tactile detection unit. If in turn, the installation tool is used as a manual device, this can more likely cause a non-coaxial alignment of the longitudinal axis of the assembly mandrel to a longitudinal axis of the thread bore. In this case, the preloading cartridge may include at least two tactile detection units so as to avoid a possible angular alignment between the longitudinal axis of the installation tool and the longitudinal axis of the thread bore. But also with respect to manual devices, the same may be equipped with one tactile detection unit only, as based on this constructive basis, a reliable operation of the installation tool is guaranteed as well.

According to a further embodiment of the installation tool, the same includes a control device with which data from at least one detection sensor of the installation tool can be received and analyzed.

With the help of the control device of the installation tool, the data detected by the used sensors may be collected and analyzed. These sensors may include at least one detection sensor of the at least one tactile detection unit as well as the mandrel sensor for monitoring the axial movement of the assembly mandrel of the installation tool. The control device may receive data from the motoric drive module on the covered rotation angle of the drive and thus of the assembly mandrel. According to a further embodiment of the installation tool, the motoric drive module may transmit information to the control device regarding the torque that is transmitted by the assembly mandrel to the wire thread insert. The torque applied by the assembly mandrel indicates whether the wire thread insert could be rotated into the inner thread of the thread bore without any problems or if during this act of rotating-in or installing the wire thread insert in the thread bore, installation errors have occurred. Because such installation errors lead to an increase in the torque as the wire thread insert leaves the predetermined inner thread of the thread opening during the installation. In the same manner, the detection of a torque which is too low serves for the interpretation of the result of the installation operation. Because a torque below a predetermined threshold indicates that the wire thread insert that is located on the assembly mandrel has not been rotated into the thread bore at all.

Furthermore, the present disclosure includes a retrofit kit for an installation tool of a wire thread insert with a drive module releasably connectable with one another and a preloading cartridge adapted to a wire thread insert having at least two preloading cartridges according to one of the previously described embodiments, which differ in terms of a construction and/or dimension of the assembly mandrel or of the preloading cartridge.

Common installation tools are also composed of a motoric drive module and a preloading cartridge. In order to be able to use these known and already available drive modules with additional technical features as installation tool, a retrofit kit with a plurality of preloading cartridges according to the different embodiments of the present disclosure may be provided. These preloading cartridges which are each releasably connectable with the available drive module can be coupled to the available motoric drive modules in order to realize the functionality of the present disclosure. Thus, a retrofit kit may include at least two preloading cartridges according to the different configurations of the present disclosure.

In case the motoric drive module does not already include a control device for assessing sensor data, known motoric drive modules may be equipped with an additional control device according to the above features.

Furthermore, the present disclosure also includes an installation method for a wire thread insert in a thread bore of a component with an installation tool, which may be an installation tool according to one of the above embodiments, having the following steps:

Pre-installing a wire thread insert on an assembly mandrel in a preloading cartridge of the installation tool, arranging the installation tool with the preinstalled wire thread insert adjacent to an entry of a thread bore in an approximately coaxial alignment of the assembly mandrel to a longitudinal axis of the thread bore, axially moving of the wire thread insert with the assembly mandrel in an installation direction into the thread bore by rotating the assembly mandrel, which may be by guiding the rotating assembly mandrel in an inner mandrel guiding thread of a preloading cartridge, detecting, during the rotating of the assembly mandrel, a covered rotation angle of the assembly mandrel from which by multiplication with a pitch of a mandrel thread of the assembly mandrel, an installation depth of a wire thread insert in the thread opening can be estimated, finishing the rotating of the assembly mandrel after a covered, predetermined rotation angle of the assembly mandrel and retrieving information from at least one tactile detection unit which projects beyond a ring-like front side of the preloading cartridge regarding a distance between the ring-like front side and the component.

The installation method for a wire thread insert is based on known approaches during the installation. Because also with the installation method, firstly, the wire thread insert may be preloaded in the preloading cartridge on the assembly mandrel and subsequently, the rotating of the wire thread insert into the thread bore is started. In order to be able to reliably assess the installation process of the wire thread insert, the covered rotation angle of the assembly mandrel is detected from the point in time when the preloading cartridge leaves through the wire thread insert in axial installation direction. The covered rotation angle indirectly provides information regarding the covered way of the wire thread insert by the wire thread insert in axial installation direction. This means that in case of immediate entry of the wire thread insert into the thread bore, the rotation angle of the assembly mandrel covered due to the rotation of the assembly mandrel, represents the installation depth of the wire thread insert. In this way, it is possible that prior to an installation process, a desired installation depth be determined, in which the wire thread insert may at least be installed.

As with the leaving of the preloading cartridge, the wire thread insert, despite rotation and axial movement of the assembly mandrel, does not immediately enter the inner thread of the thread opening of the component, parallel to the detection of the rotation angle of the assembly mandrel at the latest after the termination of the process of screwing-in the wire thread insert, the size of a distance between the ring-like front side of the preloading cartridge adjacent to the neighboring component and of the adjacent component surface of the neighbored component may be enquired. This distance may lie in a predefined tolerance range or must not exceed a predefined threshold value in order to guarantee that the wire thread insert, based on the covered rotation angle of the assembly mandrel, has been rotated into the thread bore of the component sufficiently deep. This distance is detected with the help of a tactile detection unit which may project beyond the ring-like front side of the preloading cartridge with a sensor pin in the direction of the component in installation direction. As this sensor pin may be spring-preloaded in installation direction, a contact between sensor pin and component surface causes a contact between sensor pin and component surface for a detectable deviation of the sensor pin in or contrary to the installation direction. In this way, it is possible that the distance between the ring-like front surface of the preloading cartridge and the opposite component surface is detectable.

Therefore, the installation method of the wire thread insert ends with an enquiry being made with the help of a control unit or a control device after a covered rotation angle of the assembly mandrel, as to whether the distance between the ring-like front side of the preloading cartridge and the opposite component surface lies within a predefined distance range or below a predetermined absolute distance so as to complete an installation process of the wire thread insert as being okay.

According to a further embodiment of the above installation method, the same includes the further step: assessing the detected distance of the at least one tactile detection unit as to whether the distance lies within or outside of a predetermined distance range.

The following further method step may be used: detecting an absolute distance by retrieving information from the at least one tactile detection unit and assessing if the absolute distance lies within or outside of a predetermined distance range.

According to a further embodiment of the installation method, the distance between the ring-like front side of the preloading cartridge and the opposite component surface is detected qualitatively or quantitatively in order to assess on the basis of that if the installation of the wire thread insert in the thread bore is okay or not okay. When quantitatively detecting the distance between the ring-like front side of the preloading cartridge and the component surface, the tactile detection unit detects the precise space or precise distance between the front side of the preloading cartridge and the opposite component surface. This may be realized technically with a spring-preloaded sensor pin in combination with a detection sensor. This approach forms the basis for the case when in a plugged control device, a maximum distance may be stored and the same must not be exceeded. In this case, a comparison between the stored maximum distance and the measured absolute distance would take place within the control device.

Even if the tactile detection unit would determine the distance between the ring-like front side of the preloading cartridge and the opposite component surface in absolute terms, in at least some implementations it is preferred that during the assessment of the installation method, only a qualitative evaluation with regard to the available, acceptable or inacceptable distance would be made. This means that the tactile detection unit in combination with the control device provides the information as to whether the distance lies within an allowable distance range or not. Accordingly, the information would then be provided if the installation method of the wire thread insert is okay or not.

During the installation of a wire thread insert, a torque of the assembly mandrel during the rotation of the assembly mandrel when axially moving the wire thread insert into the thread opening may be detected.

According to a further configuration of the installation method of the wire thread insert, a torque used by the assembly mandrel during the installation of the wire thread insert may be evaluated. In doing so, the absolute determination of the used torque during the installation is not the primary focus. Rather, it should be determined qualitatively based on this assessment if a reliable installation of the wire thread insert in the thread bore of the component has taken place. Because it is possible that the wire thread insert does not enter the inner thread of the thread bore when the installation process starts and is therefore not installed. This can be recognized by the fact that the torque which is applied by the assembly mandrel is too small for factually representing a screwing-in of the wire thread insert into the inner thread of the thread bore. If a detected torque of the assembly mandrel exceeded a predefined threshold value, this would indicate that an error or problem has arisen when screwing-in the wire thread insert into the inner thread of the component opening. This could be the case for example when the wire thread insert has got jammed in the thread bore during being screwed in. In this case, the installation process would also not be okay and would have to be repeated after the removing of the wire thread insert form the thread bore.

Based on that, the moving of the assembly mandrel in installation direction may be interrupted in a further step when a first, predetermined torque is exceeded and/or when a second predetermined torque is not reached.

According to a further configuration of the installation method, at least one of the following sizes may be shown on a display in a further step: the torque of the assembly mandrel, the covered rotation angle of the assembly mandrel and a distance detected by the at least one tactile detection unit.

According to different application possibilities of the installation method, the same may be used in combination with an installation automat or in combination with a manual device for the installation of a wire thread insert in a thread bore of a component. While the installation automat may carry out the data assessment of the used sensors automatically, and also may interpret these data automatically, showing these data on, for example, a display, is not necessary.

If, however, the installation method is used in combination with a manual tool by a worker, the worker may be provided with relevant sensor data on a display for the interpretation, information and/or evaluation by the worker. This display may show qualitative data. This means that with the help of an "okay" or a "not okay" symbol, a signal is given as to whether a distance and/or torque during the installation and/or the whole installation process is okay or not okay. Similarly, during the installation the worker may be provided with absolute values on a display during and/or after the installation for the distance between component surface and ring-like front side of the preloading cartridge and/or for the covered rotation angle or the axial offset of the assembly mandrel and/or for the torque applied by the assembly mandrel. This display offers the worker the possibility to asses, based on known values to be reached for distance, torque, installation depth, if an installation of the wire thread insert was successful or not.

BRIEF DESCRIPTION OF THE DRAWINGS

Embodiments of the present disclosure are described in more detail with respect to the accompanying drawings, showing.

DETAILED DESCRIPTION

Figure 1:
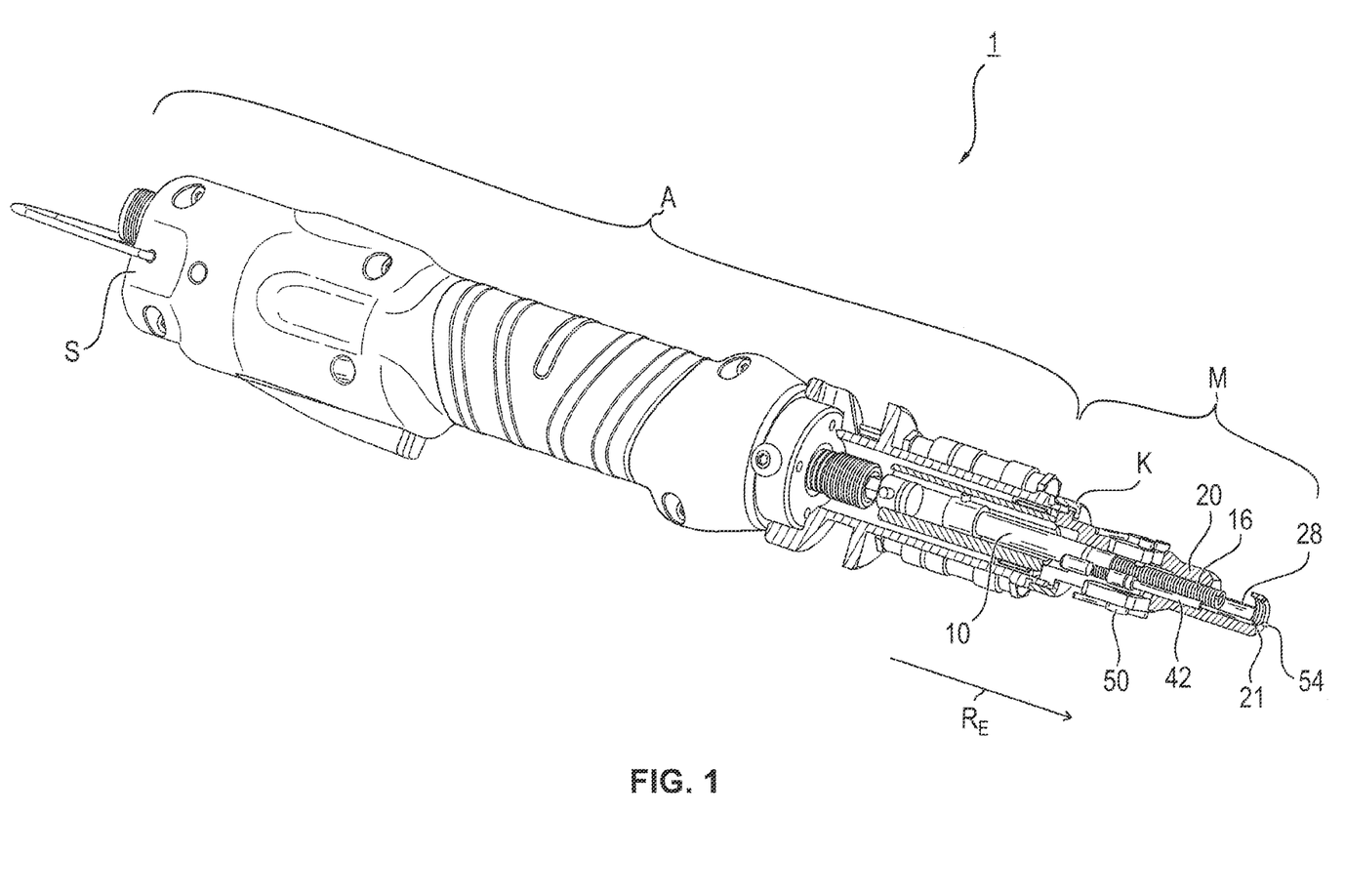
FIG. 1 an embodiment of an installation tool in a partial, perspective sectional view consisting of a drive module and an installation module, FIG. 2 an embodiment of the installation module in an enlarged perspective sectional view, FIG. 3 an embodiment of the installation module in a further enlarged perspective sectional view, FIG. 4 an embodiment of the installation module in an exploded view, FIG. 5 a schematic top view onto the contact front face with tactile detection units FIGS. 6a-6d an illustration of a sequence of installation steps of a wire thread insert in a thread opening of a component, FIGS. 7a-7d an illustration of a sequence of installation steps of a wire thread insert in a thread opening of a component, following the steps of FIG. 6, and FIG. 8 a flow chart of a further embodiment of an installation method of a wire thread insert with the installation tool.
Figure 2:
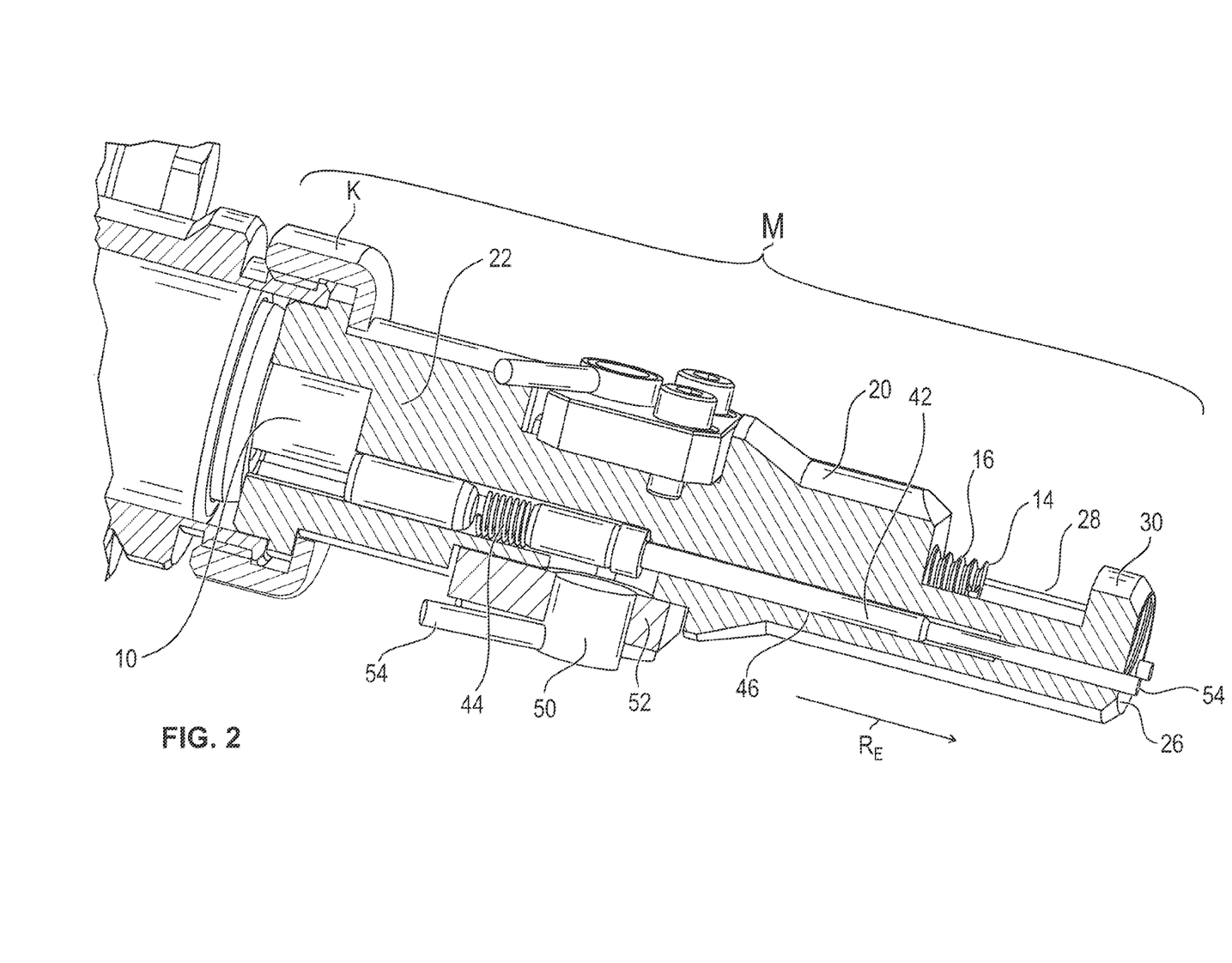

In FIG. 1, an embodiment of an installation tool 1 is shown. A wire thread insert D is installed in a bore G with inner thread of a component B with the help of the installation tool 1. Such installation tools consist of a motor-driven drive module A and an installation module M with a preloading cartridge 20. The motoric drive module A provides a rotation movement for the installation module M, which is generated according to different embodiments of the present disclosure with an electric motor or a pneumatic motor. The drive module A and the installation module M with preloading cartridge 20 may be releasably or firmly connected with one another. A drive module A and installation module M which are releasably connectable with one another, have the advantage that installation modules M which, in terms of their dimension, are adapted to different sizes of wire thread inserts D, are interchangeably connectable with the drive module A.

Such a construction of an installation tool 1 for wire thread inserts D is known in the state of the art.

Furthermore, these installation tools 1 are adapted in order to install different constructions of wire thread inserts D. These wire thread inserts D include, for example, a removable assembly tang, an installation notch or an assembly tang which can be bent back.

The installation tool 1 is suitable for the installation of these different wire thread inserts.

The installation module M with the preloading cartridge is releasably connected with the drive module A via a mechanical coupling K. This connection between drive module A and installation module M establishes a connection between a motor of the drive module A and an assembly mandrel 10 of the preloading cartridge M. By that, a rotation movement of the motor is transmitted to the assembly mandrel 10 in order to install the wire thread insert D or to remove the assembly mandrel 10 from the thread bore G. Furthermore, the installation module may comprise electric lines and/or connections in order to connect a sensor of the preloading cartridge and/or communication lines of the preloading cartridge with a control device of the installation tool.

Figure 3:
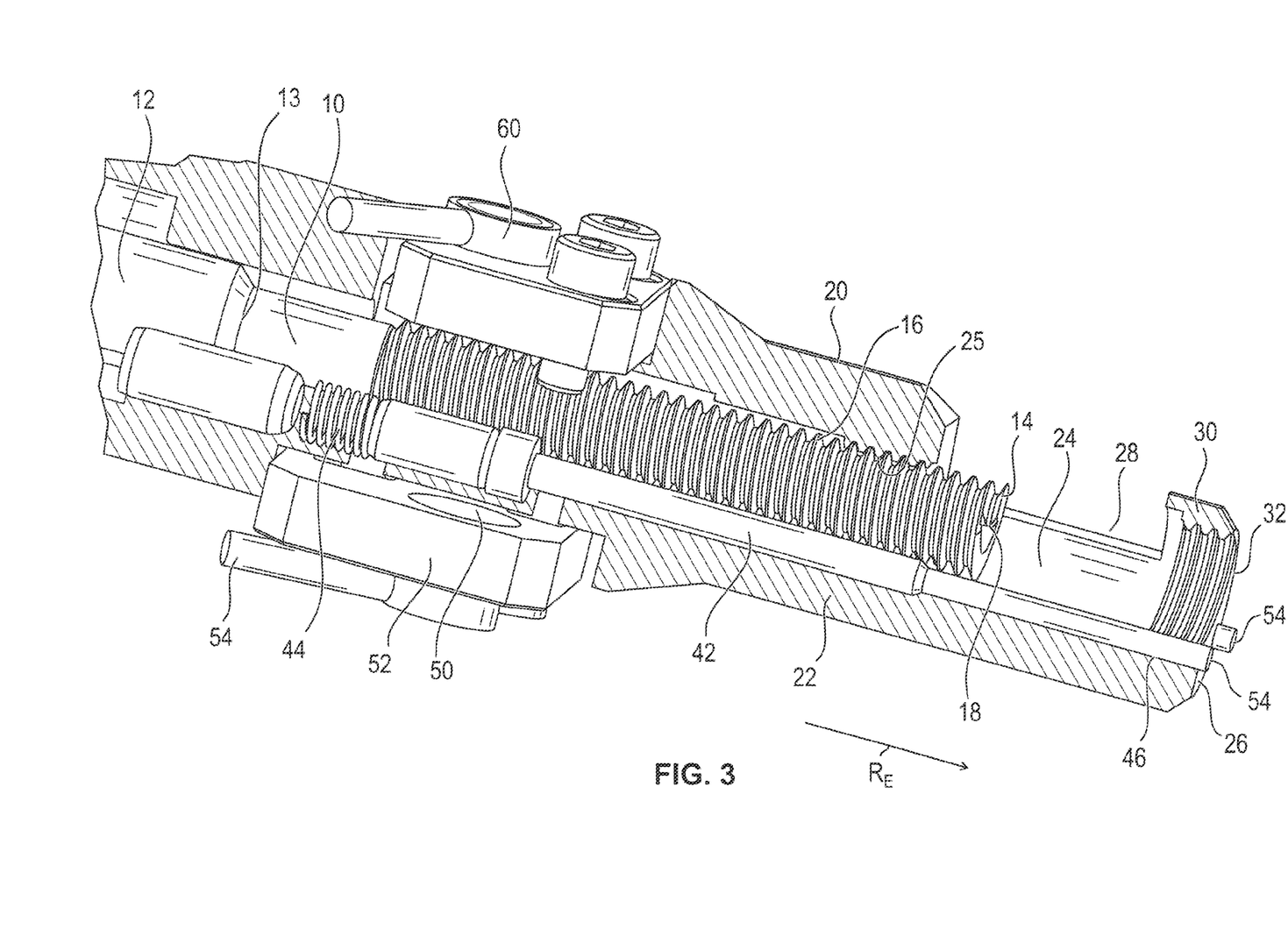
Figure 4:
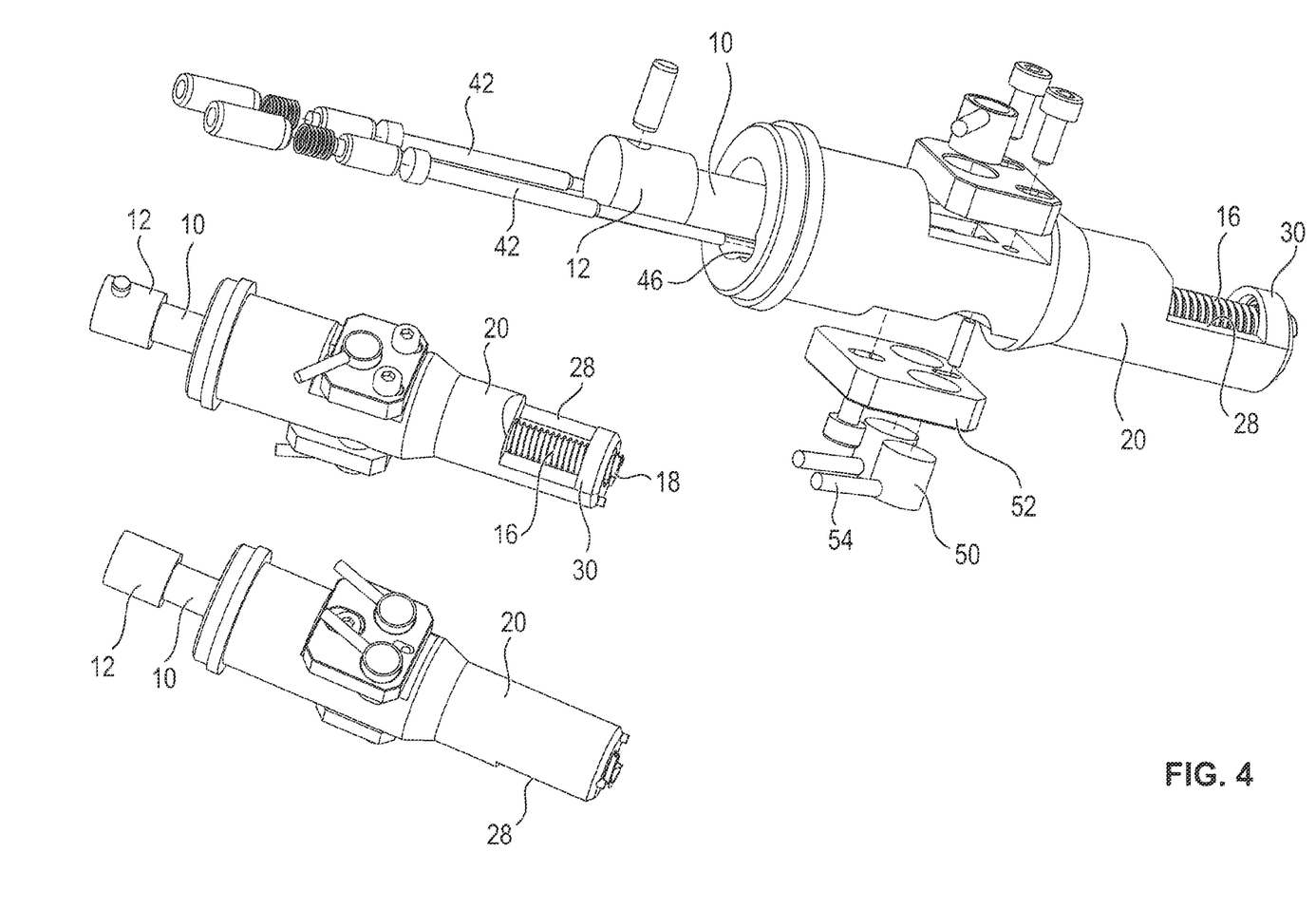
Figure 5:
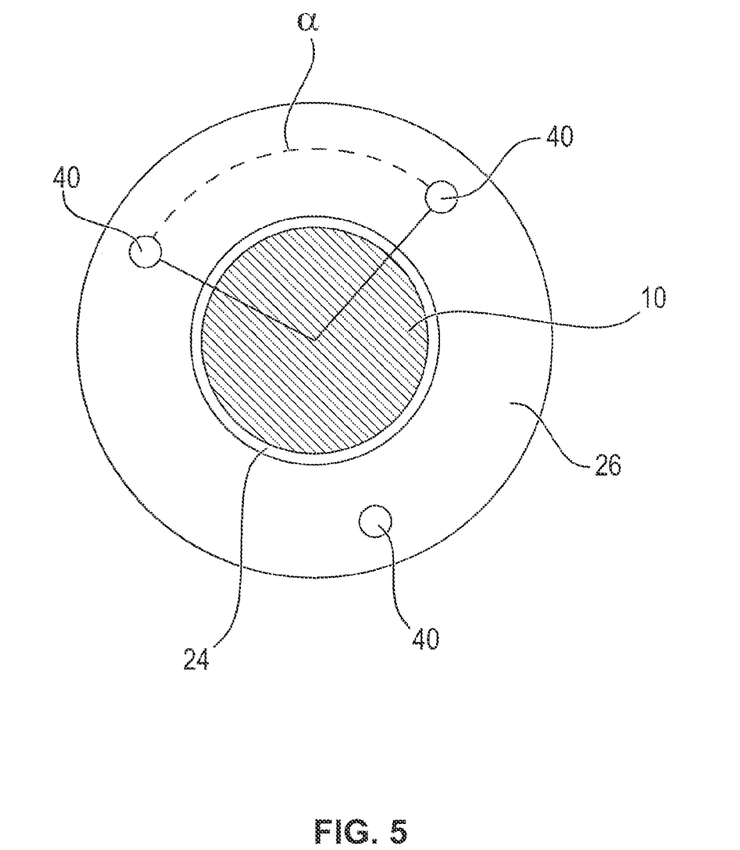

The assembly mandrel 10 has a drive end 12 in order to be connected with the motor or the drive module A, respectively. An installation thread 16 is provided on an installation end 14 of the assembly mandrel 10 onto which a wire thread insert D to be installed can be rotated on. Also, on the installation end 14, the assembly mandrel 10 is also adapted in order to come into engagement with a wire thread insert D. As an example, the assembly mandrel 10 of FIG. 3 comprises a projection 18 on a radial end side in order to hold in a rotation-proof manner, a wire thread insert D via an assembly tang (not shown) when the wire thread insert D is screwed into the thread bore G.

The assembly mandrel 10 is arranged in the preloading cartridge 20. The basic construction and the function of the preloading cartridge 20 are known in the state of the art. The preloading cartridge 20 is configured hollow-cylindrically and has a circumferential wall 22. A mandrel channel 24 is provided within the hollow-cylindrical preloading cartridge 20, in which the assembly mandrel 10 extends. The mandrel channel 24 may be arranged coaxially to a central longitudinal axis of the preloading cartridge 20.

A mandrel guiding thread 25 is provided within the mandrel channel 24 at the radial inner wall. The mandrel guiding thread 25 is configured in a matching way to the thread 16 of the assembly mandrel 10.

As a pitch of the mandrel guiding thread 25 is known, an axial offset of the assembly mandrel 10 can be calculated based on the rotation angle covered by the assembly mandrel 10 and a pitch of the mandrel guiding thread 25 and/or the thread 16. For doing so, the pitch and the revolution of the assembly mandrel 10 are multiplied.

The assembly mandrel 10 is adjusted to the preloading cartridge 20 in terms of its length. When the installation end 14 of the assembly mandrel 10 leaves the preloading ring 30 in installation direction $R_E$, a switch feature 13 of the assembly mandrel 10 moves past a mandrel sensor 60 at the same time. The mandrel sensor 60 may be configured as an inductive or optical or capacitive sensor. The switch feature 13 may be a switch edge in the construction of the assembly mandrel 10 or an inductively or capacitively or optically detectable feature.

As the assembly mandrel 10 is arranged in the mandrel channel 24, the mandrel sensor 60 may detect the switch feature 13 from the radial outside or the radial inside of the preloading cartridge 20. The mandrel sensor 60 may be arranged in the wall 22 of the preloading cartridge 20.

According to a configuration of the present disclosure, the mandrel sensor 60 may be connected or connectable with a control device S of the installation tool 1. If the preloading cartridge 20 may be provided as a retrofit kit (see below), preloading cartridges 20 of different assembly mandrel constructions and/or dimensions are each connectable with the control device S of the drive module A or the installation tool 1.

The control device S may receive the data of the mandrel sensor 60 and of further sensors such as for example at least one detection sensor 50 of the at least one tactile detection unit 40. Furthermore, the data of the drive module A may be transmitted to the control device S. This may include a torque to be applied by a motor of the drive module A in order to rotate the assembly mandrel 10 and to install a wire thread insert. The drive module A may detect a rotation angle covered by the assembly mandrel 10 and transmits these data to the control device S. The axial offset of the installation end 14 of the assembly mandrel 10 may be determined based on a covered rotation angle of the assembly mandrel 10 by multiplication with the pitch of the mandrel guiding thread 25.

A ring-like contact front face or generally front face 26 is provided at an axial end 21 of the preloading cartridge which faces away from the drive module A. The contact surface 26 may be arranged in a radial plane perpendicular to the longitudinal axis of the assembly mandrel 10. The ring-like front face 26 does not necessarily contact the adjacent surface $O_B$ of the component B during the below-described installation of a wire thread insert D.

The preloading cartridge 20 comprises a radial positioning window 28 adjacent to the axial end 21. It is known that a wire thread insert D is arranged in the preloading cartridge 20 by means of the radial positioning window 28. In the following, the wire thread insert D is wound on the thread 16 of the assembly mandrel 10 in order to subsequently be rotated into a preloading ring 30 with inner thread 32 of the preloading cartridge 20 and be preloaded in there. The wire thread insert D is later rotated into the inner thread of the thread bore G out from the preloading ring 30.

The ring-like contact front face 26 extends concentrically about the central longitudinal axis of the assembly mandrel 10. According to a further embodiment, it may lie in a radial plane perpendicular to the central longitudinal axis of the assembly mandrel 10.

In order to be able to rotate the wire thread insert that is preinstalled in the preloading cartridge 20, which may be in the preloading ring 30, into the thread bore G (step S1), the installation tool 1 is arranged adjacent to the thread bore G of a component B. For this the installation tool 1, which may be the central longitudinal axis of the assembly mandrel 10, may be arranged approximately coaxially to the central longitudinal axis of the thread bore G (see FIGS. 6 c-d).

It is assumed that the thread bore G extends perpendicularly to the component surface $O_B$ which adjoins the contact front face 26 or is arranged adjacent to it. Accordingly, the installation tool 1 may also be arranged approximately perpendicularly to the abutting component surface $O_B$.

The preloading cartridge 20 may comprise the at least one tactile detection unit 40 which may consist of a sensor pin 42 and a detection sensor 50. The sensor pin 42 is guided in a guidance or a channel 46 in the wall 22 of the preloading cartridge 20. A contact end 54 of the sensor pin 42 may be spring preloaded in installation direction $R_E$ and projects beyond the ring-like front side 26. If the contact end 54 comes into contact with a neighboring component surface $O_B$, the sensor pin may be deflected contrary to the installation direction $R_E$ against a force of a spring. The at least one detection sensor 50 detects the deflection of the sensor pin 42 and transmits the data which may be to the control device S.

If a wire thread insert is installed with the installation tool 1 in the thread bore G of a component B, the sensor pin 42 rests upon the adjacent component surface $O_B$ with the contact end 54. The associated axial deviation of the sensor pin 42 is detected by the detection sensor 50 and is transmitted to the control device S. The data which are transmitted to the control device S by the detection sensor 50 describe the distance between the ring-like front side 26 of the preloading cartridge 20 and the component surface $O_B$ of the component B with thread bore G.

The distance may be determined absolutely (absolute distance) with the detection sensor. According to a further embodiment, it may be determined if the detected distance exceeds a maximum distance or not. Thus, this corresponds to a qualitative distance determination which may not require the indication of a precise distance value.

Constructive configurations of the preloading cartridge 20, generally also referred to as installation module, which are described in combination with further embodiments of the present disclosure, may apply in the same way to the above-described preloading cartridge 20 and its features The installation method of the wire thread insert D is described in more detail with reference to the flow chart of FIG. 8 as well as the illustrations of FIGS. 6 and 7. The installation method may be carried out by the above-described preloading cartridge 20 in its embodiments in combination with the drive module A. According to a further embodiment, the installation method may be carried out with a manual tool. According to a further embodiment, the installation method may be carried out with the help of an installation automat and the preloading cartridge 20 with drive module A In the following, a further embodiment of the installation method is described, wherein further steps can be added or steps can be omitted.

For preparing the installation method, the assembly mandrel 10 is pulled back contrary to the installation direction $R_E$ by rotating in a step ST 0. In this way, the inner thread 32 of the preloading ring 30 as well as the adjacent mandrel channel 24 are freely accessible through the radial positioning window 28 for the inserting of the wire thread insert D.

Figures 6A, 6B:
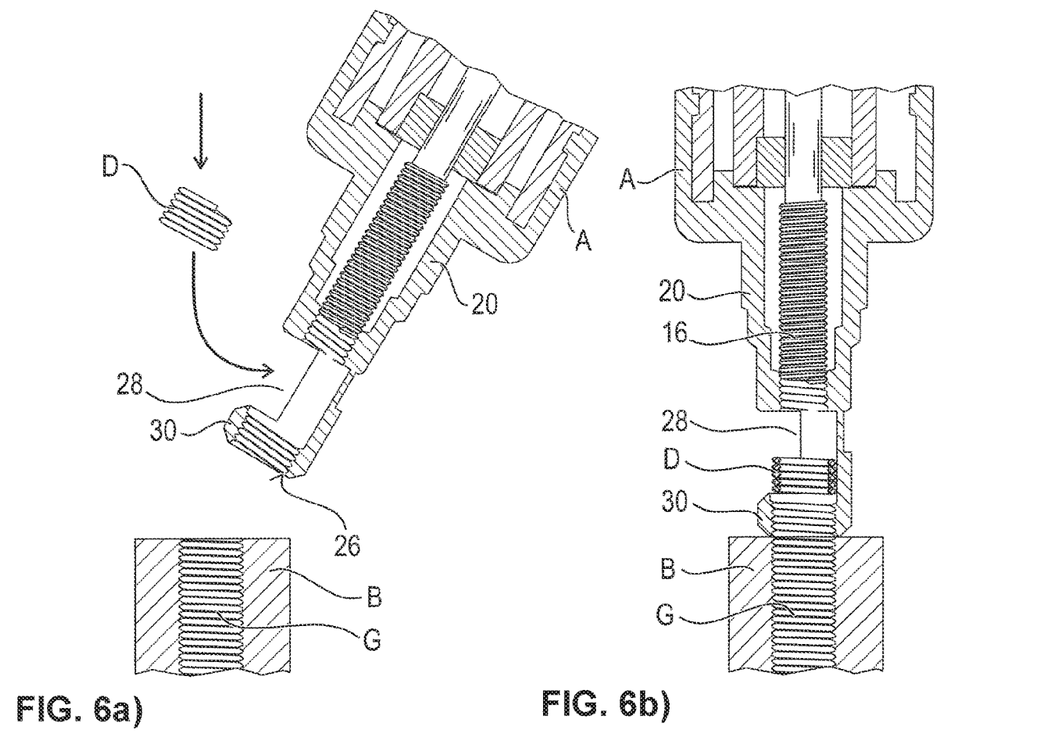
Figure 6C:
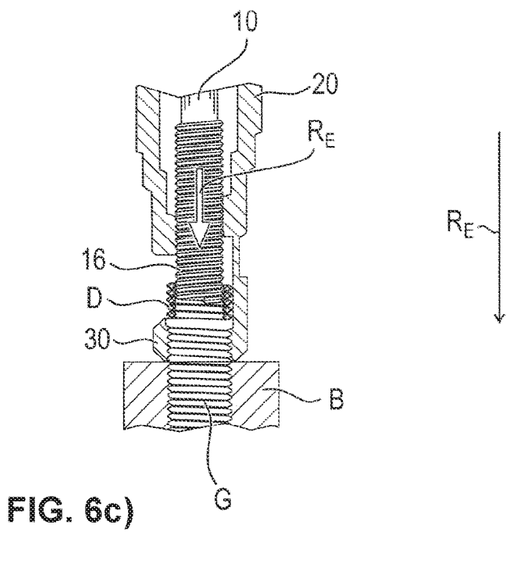
Figure 6D:
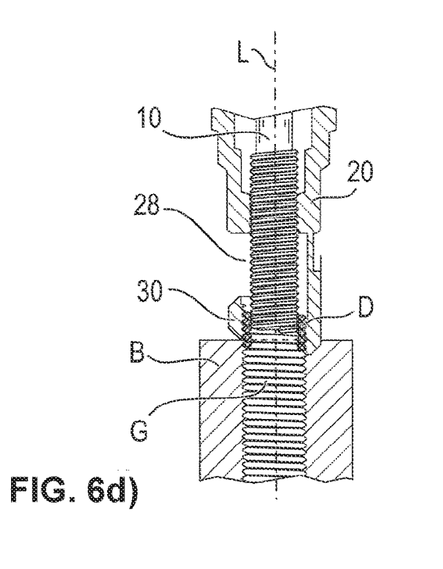

Accordingly, the wire thread insert D is positioned in installation direction $R_E$ above the preloading ring 30, as is shown in FIGS. 6a, b (ST 1).

According to a configuration of the installation method, the ring-like front side 26 may be arranged adjacent to the thread bore G and in particular, the preloading cartridge 20 may be arranged coaxially with respect to the longitudinal axis of the thread bore G. For the check of the position of the preloading cartridge 20 and thus of the installation tool 1 with respect to the thread bore G, the distance between the front side 26 and the component surface $O_B$ may be retrieved with the help of the at least one tactile detection unit 40 (ST 2).

If the detected distance lies in a predefined range, something that may be evaluated by the control device S, the installation process can be continued. When using an installation automat, this takes place automatically. When using a manual tool, the worker is informed by means of a display or an acoustic signal or an optical signal that the arrangement of preloading cartridge 20 and component B does not meet the requirements or does meet the requirements. This signal may request the worker to rearrange the installation tool and to continue with the installation process if the required distance does not meet the requirements. If the worker is signaled that the distance measuring is okay, the worker continues with the installation process. The worker may be given a signal only in case the installation is to be interrupted.

In case of a suitable arrangement of the installation tool 1 with respect to the thread opening G, which may be an arrangement of the front side 26 with a distance in a defined distance range to the neighboring component surface, further also in contact with the component surface, the assembly mandrel 10 may be rotated in step ST 3, so that it moves in the direction of the preloading ring 30, is screwed into the wire thread insert D and screws the wire thread insert D into the inner thread 32 of the preloading ring 30 or clamps it there (see FIGS. 6b, c).

During the step ST 3, the torque which may be transmitted by the motor of the drive module A to the assembly mandrel 10 may be compared with a predetermined maximum torque. If a predetermined maximum torque is exceeded, this indicates that there is a defect in the preinstallation of the wire thread insert D in the preloading ring 30.

The comparison between the current torque of the assembly mandrel 10 and a maximum torque may be carried out in the control device S. Alternatively, this comparison takes place in real time during the preinstallation or after termination of the preinstallation.

If there is a defect in the preinstallation, the assembly automat may rotate the assembly mandrel 10 back and moves it contrary to the installation direction $R_E$. During operation of a manual tool, the worker is informed acoustically, optically or via a display about the determined defect or the determined exceedance of the maximum torque. Accordingly, the worker then moves the assembly mandrel 10 back in order to diagnose the reason for the defect and to rectify the defect.

Figure 7A:
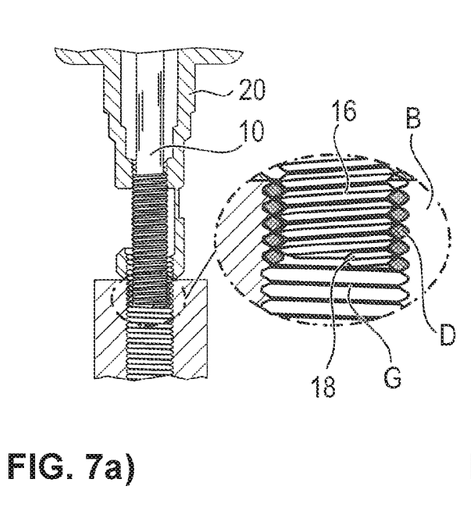
Figure 7B:
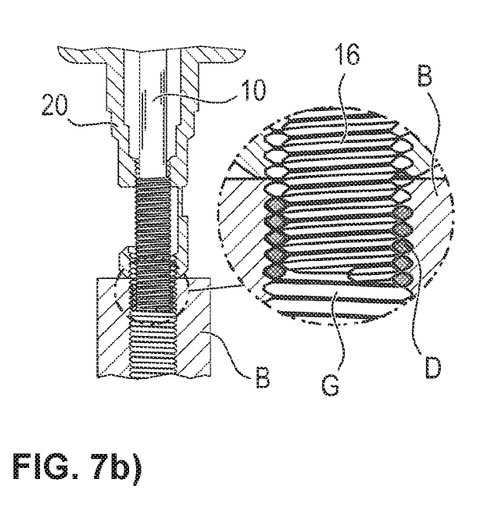
Figure 7C:
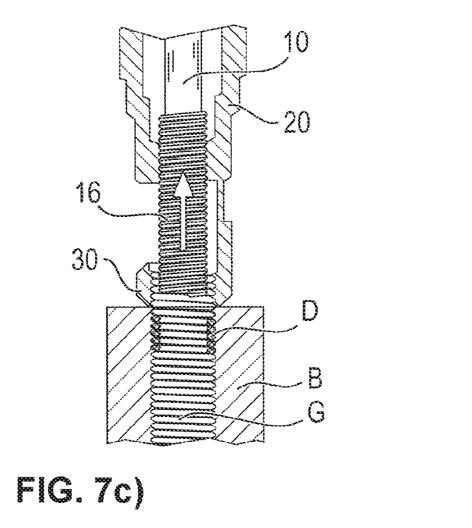
Figure 8:
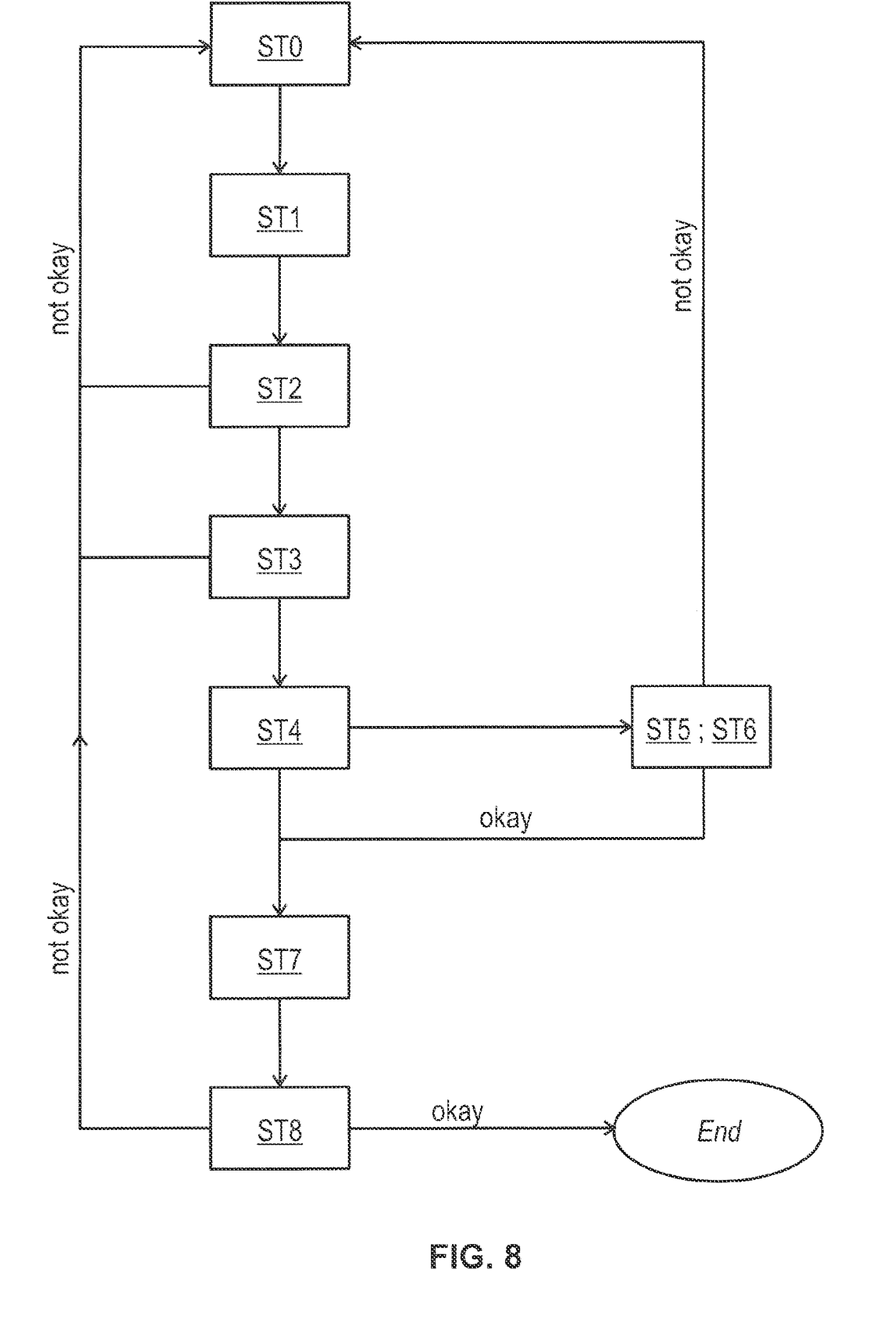

Once the wire thread insert D has been preinstalled in the preloading cartridge 20, the installation or the screwing-in of the wire thread insert D into the thread opening G of the component B takes place in step ST 4 (see FIGS. 7a, b).

For this purpose, the worker starts the rotation of the assembly mandrel 10 manually at the manual tool and the installation automat starts it automatically. By that, the assembly mandrel 10 and thus the installation end 14 with wire thread insert D moves in the installation direction $R_E$ to the component B and into the thread bore G. While the assembly mandrel 10 moves in the installation direction $R_E$, the installation end 14 with wire thread insert leaves the preloading ring 30. When the installation end 40 leaves the preloading cartridge 20, the switch feature 13 moves past the mandrel sensor 60 at the same time and starts detecting the rotation angle covered from this point in time by the assembly mandrel 10 (ST 5). As has already been described above, it is calculated how far the installation end 14 has moved in installation direction $R_E$ based on the covered rotation angle of the assembly mandrel 10.

This constructive arrangement may also enable the embodiment of the installation method by the control device S specifying a maximum installation way of the assembly mandrel 10 in installation direction $R_E$ starting at the face side 26 of the preloading cartridge 20. The maximum installation way may be stipulated by a predefined rotation angle which is stored in the control device S. The rotation angle is detected as soon as the switch feature 13, which may be a switch edge of the assembly mandrel 10, has passed the mandrel sensor 60. As soon as the detected, covered rotation angle of the assembly mandrel 10 has reached the predefined value, the rotation of the assembly mandrel 10 is stopped (ST 7). In this way, a desired maximum installation depth of the wire thread insert D in the thread bore G may be prescribed.

The used torque may be detected and assessed by the assembly mandrel (ST 6) during the entering of the wire thread insert D into the thread bore G. In case the torque exceeds a predetermined threshold value, this indicates that there is a defect in the installation. Accordingly, the installation process is stopped and the assembly mandrel 10 is removed from the thread bore G. This takes place automatically by the installation automat or manually by the worker with the help of rotating back the assembly mandrel 10.

According to a further embodiment of the present installation method, the distance between the ring-like front side 26 and the adjacent component surface $O_B$ may be assessed by the control device S (ST 8). The data for assessing the distance may be provided by the at least one tactile detection unit 40 with the sensor pin 42 to the control device S, the contact end 54 of which may engage the component surface $O_B$. The control device S compares the delivered distance data with a maximum distance that is predefined or stored in the control device S. If the maximum distance is exceeded, the installation of the wire thread insert D is not okay. Accordingly, the installation mandrel 10 is rotated back and the installation process is qualified as not concluded or not okay.

If the detected distance of the tactile detection unit 40 confirms a contact to the component surface $O_B$ or a distance value below the predefined maximum distance, the installation is concluded as okay. Subsequently, the installation mandrel 10 is removed from the wire thread insert D.

According to a further application of the installation method, the wire thread insert D is rotated into the thread bore G until it is below the component surface $O_B$. In this way, the thread bore G is reinforced better than in case the wire thread insert D abutted the component surface $O_B$ after the installation to the component surface $O_B$. Therefore, a rotation angle for the installation and thus a movement of the assembly mandrel 10 in installation direction $R_E$ may be prescribed for a distance which exceeds the axial length of the wire thread insert D by a certain minimum amount, which may be the pitch of the mandrel guiding thread multiplied by an angle of for example 450°. The minimum amount may be chosen according to the application case.

The above selected installation distance of length of the wire thread insert D plus 450° rotation angle of the assembly mandrel 10 multiplied by the pitch of the thread of the installation mandrel 10 may guarantee that the wire thread insert D is installed up to below the component surface $O_B$. At the beginning of the entering of the wire thread insert D into the thread bore G, it is open if the wire thread insert D immediately enters the inner thread of the thread bore G. Rather, the wire thread insert D may enter the inner thread of the thread bore G only after a rotation angle of the assembly mandrel 10 of a maximum of 360°. The consequence of this entering, which is belated by a certain rotation angle offset, of the wire thread insert D into the inner thread of the thread opening G is that for the conclusion of the installation of the wire thread insert D, the ring-like front side 26 of the preloading cartridge 20 is arranged at a distance to the component surface $O_B$. This distance corresponds approximately to the product out of rotation angle offset and pitch of the mandrel guiding thread or the mandrel thread 16 or the wire thread insert D, as they may be the same.

As for the conclusion of the installation of the wire thread insert D, the distance is assessed which may be detected by the at least one tactile detection 41, a possible rotation angle offset and the distance resulting from it may also be taken into account in this context. Thus, an installation of the wire thread insert D is also considered as being okay when the ring-like front side 26 is arranged to the component surface by the distance according to the product out of rotation angle offset, which may be at most 360°, and pitch of the thread 16 of the assembly mandrel 10.

The invention claimed is:

1. A hollow-cylindrical preloading cartridge of an installation tool of a wire thread insert comprising the following features:
   a. a mandrel channel extending within the preloading cartridge, in which an assembly mandrel with an installation end and a drive end is guided in an inner mandrel guiding thread,
   b. an outer wall of the preloading cartridge which encompasses the mandrel channel at least partly with a radial positioning window adjacent to a first axial end of the preloading cartridge facing away from the drive end of the assembly mandrel, through which a wire thread insert is positionable in the mandrel channel on the assembly mandrel,
   c. at least a first tactile detection unit projecting beyond a preferably ring-like front side of the preloading cartridge on the first axial end and being offsetable parallel to a longitudinal axis of the preloading cartridge, wherein an axial offset of the at least one tactile detection unit is detectable with a first detection sensor of the preloading cartridge.

2. The hollow-cylindrical preloading cartridge according to claim 1, in which the at least one tactile detection unit comprises a sensor pin that is arranged in a spring-preloaded manner in a channel of the outer wall.

3. The hollow-cylindrical preloading cartridge according to claim 2, the sensor pin of which comprises an axial feeler end and an axial detection end wherein the axial feeler end is arranged adjacent to the preferably ring-like front side and the axial detection end is arranged adjacent to the first detection sensor.

4. The hollow-cylindrical preloading cartridge according to claim 1, the assembly mandrel of which includes a switch feature adjacent to the drive end which interacts with a mandrel sensor in order to detect an axial offset of the assembly mandrel in an installation direction of the wire thread insert.

5. The hollow-cylindrical preloading cartridge according to claim 1, wherein the first detection sensor and/or preferably a mandrel sensor is an inductive sensor or a capacitive sensor or an optical sensor.

6. The hollow-cylindrical preloading cartridge according to claim 1, including a second tactile detection unit which projects beyond the ring-like front side of the preloading cartridge at the first axial end and is offsetable parallel to a longitudinal axis of the preloading cartridge, wherein an axial offset of the second tactile detection unit is detectable with a second detection sensor of the preloading cartridge.

7. The hollow-cylindrical preloading cartridge according to claim 6, wherein the first and the second tactile detection unit are spaced from one another by an angle from the range of 10° to 350° on the ring-like front side.

8. The hollow-cylindrical preloading cartridge according to claim 1, with an axial section between the ring-like front side and the positioning window including an inner thread for the preinstallation of a wire thread insert.

9. An installation tool of a wire thread insert with a motoric drive module and an installation module with a hollow-cylindrical preloading cartridge according to claim 1.

10. The installation tool according to claim 9, in which the installation module is releasably connectable with the drive module.

11. The installation tool according to claim 9, which is connected with an installation automat, preferably controlled by a robot, or is provided as a manual device.

12. The installation tool according to claim 9, which includes a control device with which data from at least one detection sensor of the installation tool can be received and analyzed.

13. An installation method for a wire thread insert in a thread bore of a component with an installation tool according to claim 9, having the following steps:
 a. pre-installing a wire thread insert on an assembly mandrel in a preloading cartridge of the installation tool,
 b. arranging the installation tool with the preinstalled wire thread insert adjacent to an entry of a thread bore in an almost coaxial alignment of the assembly mandrel to a longitudinal axis of the thread bore,
 c. axially moving of the wire thread insert with the assembly mandrel in an installation direction into the thread bore by rotating the assembly mandrel, in particular by a guiding of the rotating assembly mandrel in an inner mandrel guiding thread of a preloading cartridge,
 d. detecting of a rotation angle covered during the rotating of the assembly mandrel from which by multiplication with a pitch of a mandrel thread of the assembly mandrel, an installation depth of a wire thread insert in the thread opening can be estimated,
 e. finishing the rotating of the assembly mandrel after a covered, predetermined rotation angle of the assembly mandrel and
 f. retrieving information from at least one tactile detection unit which projects beyond a front side of the preloading cartridge regarding a distance between the front side and the component.

14. The installation method according to claim 13, having the further step:
 assessing the detected distance of the at least one tactile detection unit as to whether the distance lies within or outside of a predetermined distance range.

15. The installation method according to claim 13, with the further step:
 detecting an absolute distance by retrieving information from the at least one tactile detection unit and assessing if the absolute distance lies within or outside of a predetermined distance range.

16. The installation method according to claim 13, with the further step:
 detecting a torque of the assembly mandrel during the rotating of the assembly mandrel when axially moving the wire thread insert into the thread opening.

17. The installation method according to claim 16, with the further step:
 interrupting the moving of the assembly mandrel in installation direction when a first, predetermined torque is exceeded and/or
 interrupting the moving of the assembly mandrel in installation direction when a second predetermined torque is not reached.

18. The installation method according to claim 13, with the further step:
 showing at least one of the following sizes on a display: the torque of the assembly mandrel, the covered rotation angle of the assembly mandrel or a distance detected by the at least one tactile detection unit.

19. A retrofit kit for an installation tool of a wire thread insert with a drive module and an installation module which are releasably connectable with one another, wherein the installation module is adapted to a wire thread insert having at least two preloading cartridges according to claim 1, which differ in terms of a construction and/or dimension of the assembly mandrel or of the preloading cartridge.

* * * * *